(12) United States Patent
Saraswathi

(10) Patent No.: US 11,391,207 B2
(45) Date of Patent: Jul. 19, 2022

(54) ANTI-ICING SYSTEM HAVING A NOZZLE WITH A DEFLECTOR PLATE AND METHOD

(71) Applicant: General Electric Company, Schenectady, NY (US)

(72) Inventor: Rajesh Prabhakaran Saraswathi, Bangalore (IN)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 16/745,312

(22) Filed: Jan. 16, 2020

(65) Prior Publication Data
US 2021/0222583 A1    Jul. 22, 2021

(51) Int. Cl.
*F02C 7/047* (2006.01)
*F01D 25/02* (2006.01)

(52) U.S. Cl.
CPC .............. *F02C 7/047* (2013.01); *F01D 25/02* (2013.01); *F05D 2220/76* (2013.01); *F05D 2240/128* (2013.01); *F05D 2270/303* (2013.01)

(58) Field of Classification Search
CPC .. F02C 7/047–057; F02C 7/185; F02C 7/141; F02C 6/08; B64D 2013/0607; B64D 2013/0666; B64D 15/00–22; B64D 2033/0233; B64C 1/067; F01D 25/305; F05D 2240/127; B05B 1/002; B05B 1/005
See application file for complete search history.

(56) References Cited

U.S. PATENT DOCUMENTS

| | | | |
|---|---|---|---|
| 5,166,479 A | 11/1992 | Gras et al. | |
| 8,272,222 B2 | 9/2012 | Zhang et al. | |
| 9,771,865 B2 | 9/2017 | Merchant et al. | |
| 10,022,660 B2* | 7/2018 | Santini | B01D 46/0068 |
| 10,663,170 B2* | 5/2020 | Abu-Irshaid | F23R 3/002 |
| 2004/0256174 A1 | 12/2004 | Friou | |
| 2017/0234220 A1* | 8/2017 | Saraswathi | F02C 7/047 415/1 |
| 2018/0272167 A1* | 9/2018 | Ahmadzadegan | A62C 99/0018 |
| 2018/0274445 A1* | 9/2018 | Sankarakumar | F02C 7/045 |
| 2019/0003387 A1* | 1/2019 | Ponyavin | F02C 9/18 |

FOREIGN PATENT DOCUMENTS

DE    4009552 A1    9/1991
EP    1461513 B1    8/2006

OTHER PUBLICATIONS

U.S. Appl. No. 17/131,280, filed Dec. 22, 2020, Francisco Gomez.
U.S. Appl. No. 17/131,301, filed Dec. 22, 2020, Francisco Gomez.

\* cited by examiner

*Primary Examiner* — Stephanie Sebasco Cheng
(74) *Attorney, Agent, or Firm* — Fletcher Yoder, P.C.

(57) ABSTRACT

An anti-icing assembly includes a nozzle and a deflector plate. The nozzle includes one or more outlets configured to inject a heated fluid into an airflow along an airflow path upstream of a filter. The deflector plate is disposed upstream of the one or more outlets, wherein the deflector plate extends in a crosswise direction relative to a central axis of the nozzle to an outer edge of the deflector plate. The outer edge is offset in the crosswise direction relative to the one or more outlets, and the deflector plate is configured to spread the airflow upstream of the one or more outlets.

20 Claims, 8 Drawing Sheets

ANTI-ICING SYSTEM HAVING A NOZZLE WITH A DEFLECTOR PLATE AND METHOD

BACKGROUND

The subject matter disclosed herein relates to gas turbine systems and, more specifically, to anti-icing systems.

Gas turbine systems generally include a compressor, a combustor, and a turbine. The compressor compresses air received from an air intake. The compressed air from the compressor is mixed with fuel and, in the combustor, is combusted to produce combustion gases. The combustion gases are directed into a turbine. In the turbine, the combustion gases are used to rotate (e.g., drive) turbine blades in the turbine and a shaft to which the turbine blades are secured. The rotating shaft may drive a load, such as an electrical generator that is coupled to the shaft.

The temperature of the air received into the air intake may affect the performance of the gas turbine. For example, if the ambient temperature is too low, then icing can potentially occur in the air intake. For example, the air intake can potentially intake snow, rain, and/or moisture (i.e., humid air), which can result in build-up and/or formation of ice on the filter and other components in the air intake or compressor. In these conditions, the filter may be less effective at filtering the airflow and/or ice particles can potentially pass through the filter to the compressor. An effective anti-icing system is needed to uniformly distribute heat across the filter, thereby avoiding any cold spots that could still reduce the performance of the filter.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an anti-icing assembly. The anti-icing assembly has a nozzle that has one or more outlets configured to inject a heated fluid into an airflow along an airflow path upstream of a filter. Further, the system includes a deflector plate disposed upstream of the one or more outlets, wherein the deflector plate extends in a crosswise direction relative to a central axis of the nozzle to an outer edge of the deflector plate. The outer edge of the deflector plate is offset in the crosswise direction relative to the one or more outlets, and the deflector plate is configured to spread the airflow upstream of the one or more outlets.

In a second embodiment, a system includes an anti-icing assembly. The anti-icing assembly has a deflector plate configured to be disposed upstream of one or more outlets of a nozzle that injects a heated fluid into an airflow along an air airflow path upstream of a filter. The deflector plate extends in a crosswise direction relative to a central axis of the nozzle to an outer edge of the deflector plate. The outer edge of the deflector plate is offset in the crosswise direction relative to the one or more outlets, and the deflector plate is configured to spread the airflow upstream of the one or more outlets.

In a third embodiment, a method includes injecting a heated fluid through one or more outlets of a nozzle into an airflow along an airflow path upstream of a filter to inhibit icing of the filter. The method also includes spreading the airflow upstream of the one or more outlets via a deflector plate disposed upstream of the one or more outlets. The deflector plate extends in a crosswise direction relative to a central axis of the nozzle to an outer edge of the deflector plate. The outer edge is offset in the crosswise direction relative to the one or more outlets.

BRIEF DESCRIPTION OF THE DRAWINGS

These and other features, aspects, and advantages of the present anti-icing system and method will become better understood when the following detailed description is read with reference to the accompanying drawings in which like characters represent like parts throughout the drawings, wherein.

DETAILED DESCRIPTION

Figure 1:
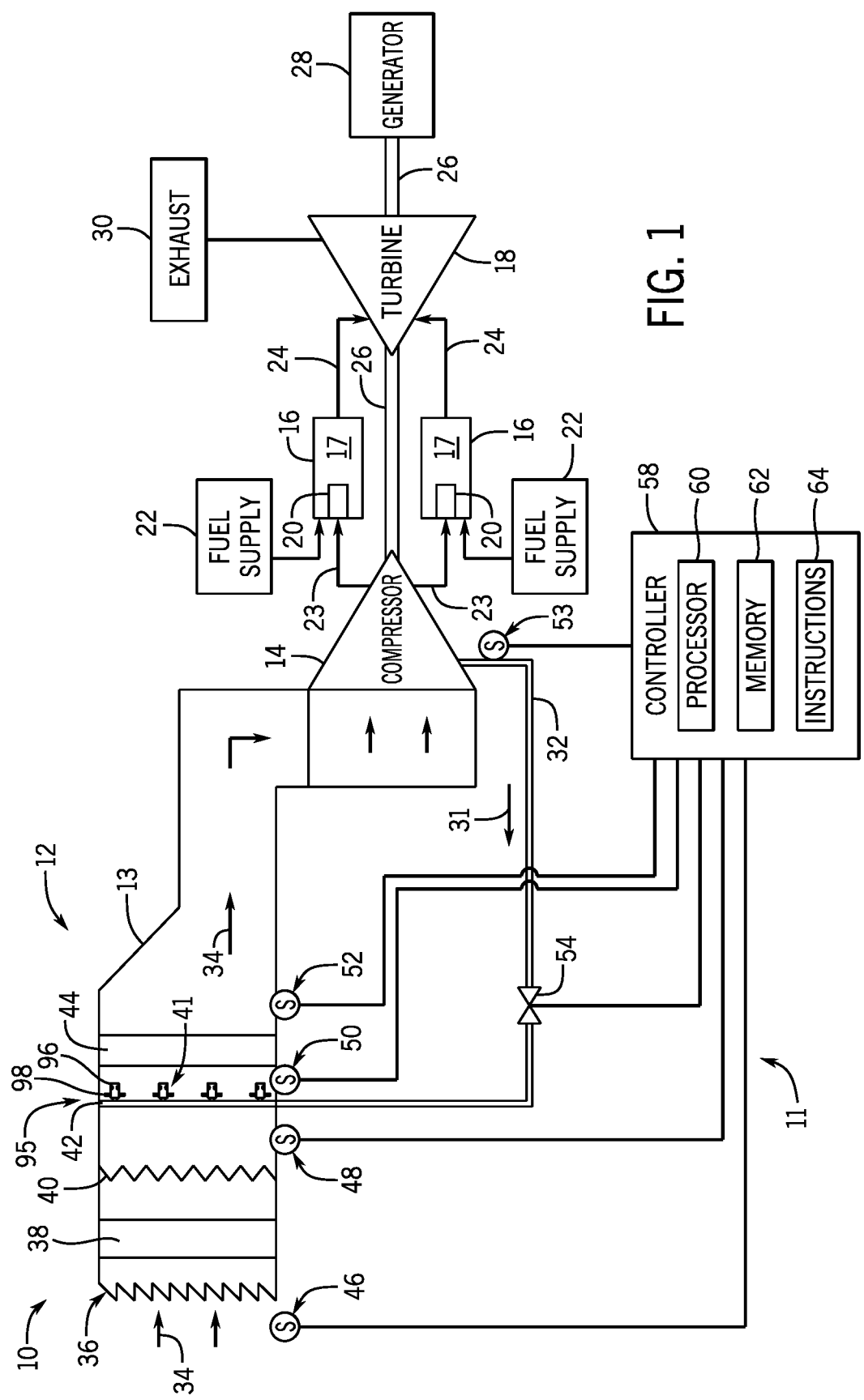
FIG. 1 is a block diagram of a gas turbine system having an anti-icing system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include an anti-icing system for a gas turbine system. The anti-icing system may be used to provide an elevated temperature of the airflow (e.g., a target temperature above the ambient temperature) along an airflow path through an air intake (e.g., an air intake conduit having filters) upstream of a compressor, particularly when the ambient temperature is below a threshold temperature (e.g., at or below 0 degrees Celsius). The anti-icing system may be used to inhibit and/or remove ice formation in the air intake, the compressor, or in any other part of the gas turbine system.

Specifically, in certain embodiments, the anti-icing system is configured to increase a distribution of a heated fluid into the airflow path through the air intake upstream of a compressor of the gas turbine system. In particular, the anti-icing system includes one or more deflector plates configured to spread a heated fluid laterally across the airflow path upstream of at least one filter in the air intake conduit. For example, an embodiment of the anti-icing system includes a plurality of nozzles configured to inject the heated fluid in crosswise directions relative to the direction of the airflow through the airflow conduit, in which each nozzle of the plurality of nozzles has an associated deflector plate configured to deflect the airflow at a position upstream of the heated fluid being injected by the respective nozzle. The deflector plate acts as a protective shield to enable the heated fluid injected by each nozzle to penetrate further into the airflow in the crosswise direction, such that each nozzle distributes the heated fluid over a larger surface area of the filter (i.e., as compared with a nozzle without a deflector plate). As a result, a relatively smaller number of nozzles may be used to effectively distribute the heated fluid over the surface. By improving the heat distribution across the surface area of the filter, the disclosed embodiments of the anti-icing system help to reduce the possibility of ice formation and to improve the performance of the gas turbine system.

The deflector plates may be sized sufficiently large to increase the distribution of the heated fluid from the nozzles. For example, the deflector plates (e.g., annular deflector plates) may have a deflector diameter of at least equal to or greater than 2, 3, 4, 5, or 6 times the diameter of the nozzle. The larger the deflector diameter, the greater the distribution of the heated fluid from the nozzle. In contrast to the disclosed embodiments, a nozzle without a deflector plate cannot distribute the heated fluid as far into the airflow, because the airflow itself redirects the heated fluid in the downstream direction closer to the nozzle. As a result, an anti-icing system using nozzles without deflector plates may require a substantially larger number of nozzles, thereby increasing the cost and complexity of the anti-icing system. The disclosed embodiments use the deflector plates to improve the distribution of the heated fluid, while also allowing for a reduction in the number of the nozzles.

Turning now to the drawings, FIG. 1 provides a diagram of an embodiment of a gas turbine system 10 (e.g., gas turbine engine) having an anti-icing system 11. As discussed in further detail below, the anti-icing system 11 includes an anti-icing assembly 41, one or more sensors (designated as "S") to monitor operational conditions, and a controller 58 configured to monitor the sensors and control the anti-icing assembly 41. The anti-icing assembly 41 may include a manifold 42 (e.g., an inlet bleed heat [IBH] manifold) and a plurality of anti-icing nozzle assemblies 95 (e.g., a plurality of nozzles 96 and associated deflector plates 98). The deflector plates 98 (e.g., flow shields, diverters, baffles, etc.) are configured to help distribute a heated fluid from the nozzles 96. The gas turbine system 10 includes an air intake 12 having an air intake conduit 13, a compressor 14 having one or more compressor stages, one or more combustors 16, and a turbine 18 having one or more turbine stages. The gas turbine system 10 intakes and filters an airflow 34 through the air intake 12, compresses the airflow through the one or more compressor stages of the compressor 14, and combusts a fuel with the airflow in one or more combustors 16. Each combustor 16 has one or more fuel nozzles 20 configured to inject a liquid fuel and/or a gaseous fuel (e.g., natural gas or syngas) from one or more fuel supplies 22 into a combustion chamber 17. Although not shown, in some embodiments, fuel nozzles 20 may include primary and secondary fuel nozzles that inject fuel at a primary fuel injection zone and a secondary fuel injection zone, respectively.

Each combustor 16 combusts the fuel injected by the fuel nozzles 20 with a compressed airflow 23 from the compressor 14 to create hot, pressurized combustion gases 24 (e.g., exhaust gas), which is then directed into the turbine 18. The turbine 18 has turbine blades coupled to a shaft 26, which in turn is coupled to a load such as an electric generator 28. As the combustion gases 24 flow into and through the turbine 18, the combustion gases 24 drive rotation of the turbine blades and the shaft 26, thereby driving the electric generator 28. In some embodiments, the shaft 26 may be connected to another load, such as machinery, a propeller of an aircraft or ship, or a compressor. Eventually, the combustion gases 24 exit the gas turbine system 10 via an exhaust section 30 (e.g., an exhaust diffuser, an exhaust duct, an exhaust stack or tower, an emissions control system such as a selective catalytic reduction (SCR) system, etc.). In the illustrated embodiment, the shaft 26 is coupled to a compressor shaft of the compressor 14, which has compressor blades coupled to the compressor shaft in one or more stages (e.g., 1 to 30 stages in different axial positions). The rotation of the blades within the compressor 14 causes compression of air from the air intake 12, thereby providing the compressed airflow 23 to each combustor 16 (e.g., to the fuel nozzles 20).

Furthermore, the gas turbine system 10 also extracts or bleeds a portion of the compressed airflow (e.g., a heated fluid or heated fluid flow as indicated by arrow 31) from the compressor 14 through an extraction or bleed conduit 32 into the manifold 42 of the anti-icing system 11. The manifold 42 distributes the compressed airflow (e.g., heated fluid flow) through the plurality of nozzles 96 having deflector plates 98, thereby distributing the compressed airflow (e.g., distributed heated fluid flow) into the main airflow 34 passing through the air intake 12. As illustrated, the manifold 42, nozzles 96, and deflector plates 98 are positioned upstream from a filter 44 in the air intake conduit 13, such that the distributed heated fluid flow helps to inhibit and/or remove ice formation on the filter 44.

The anti-icing system 11 may include one or more bleed conduits 32 coupled to the compressor 14 at or downstream from each, some, or one of the one or more compressor stages. The compressor 14 increases the pressure and temperature of the airflow with each subsequent compressor stage, and thus the bleed conduit 32 may extract the compressed airflow at a particular compressor stage with a suitable pressure and temperature for use in the anti-icing system 11. In certain embodiments, the anti-icing system 11 may selectively extract the compressed airflow (e.g., heat fluid or heated fluid flow as indicated by arrow 31) through one or more bleed conduits 32 in response to monitored temperature sensors indicating the ambient temperature of the airflow entering the air intake 12, the temperature entering the filter 44, and/or the temperature entering the compressor 14. For example, with a progressively lower ambient temperature, the anti-icing system 11 may extract the compressed airflow through a greater number of bleed conduits 32 and/or through bleed conduits 32 at progressively later compressor stages of the compressor 14.

The air intake 12 receives an airflow 34 through an air hood 36 (e.g., a plurality of intake baffles) coupled to the air intake conduit 13, which in turn houses a sequence of air intake components including a baffle section having a plurality of silencer baffles 38, a coalescer section having one or more coalescers 40, the manifold 42 having the nozzles 96 and deflector plates 98 of the anti-icing system 11, and a filter section having one or more filters 44. The anti-icing system 11 also includes a plurality of sensors, designated as "S", to monitor ambient conditions and operational conditions throughout the gas turbine system 10, such as the temperature, humidity, or various conditions conducive to ice formation. For example, the anti-icing system 11 may include one or more sensors 46 positioned at or outside of the air hood 36, thereby sensing ambient conditions of the air (e.g., ambient temperature, humidity, etc.) The anti-icing system 11 may include one or more sensors 48 positioned at or upstream of the manifold 42, such as between the manifold 42 and the air hood 36, the silencer baffles 38, and/or the coalescers 40. The anti-icing system 11 also may include one or more sensors 50 positioned at or downstream from the manifold 42, such as at the filter 44 or between the manifold 42 and the filter 44. Furthermore, the anti-icing system 11 may include one or more sensors 52 positioned downstream of the filter 44, such as at or upstream of the intake of the compressor 14. The anti-icing system 11 also may include one or more sensors 53 disposed along each of the bleed conduits 32. Each of these sensors 46, 48, 50, 52, and 53 may be configured to monitor one or more conditions, such as temperature, pressure, flow rate, humidity, gas composition, or any combination thereof.

The anti-icing system 11 also includes a controller 58 communicatively coupled to the sensors 46, 48, 50, 52, and 53, a valve 54 disposed along each bypass in bleed conduit 32, and various components of the gas turbine system 10 (e.g., valves that control a supply of the fuel from the fuel supply 22 to the fuel nozzles 20). The controller 58 has a processor 60, a memory 62, and computer-readable instructions 64 stored on the memory 62 and executable by the processor 60. The controller 58 obtains sensor readings from sensors 46, 48, 50, and 52 regarding conditions of the ambient air and the airflow through the air intake conduit 13. The controller 58 also obtains sensor readings from each sensor 53 regarding conditions of the compressed airflow (e.g., heated fluid flow) extracted from the compressor 14. The controller 58 may use the computer-readable instructions 64 to regulate the operation of the anti-icing system 11 based on these sensor readings, upper and lower thresholds for temperature, computer models, and user input.

In certain embodiments, the controller 58 may control the flow of a heated fluid (e.g., the compressed airflow through bleed conduit 32) to the manifold 42 and the plurality of nozzles 96 based on an upper temperature threshold and/or a lower temperature threshold (or other monitored condition as noted above) at the location of any of the sensors 46, 48, 50, and 52, or a combination thereof. For example, if the temperature at one or more of the sensors 46, 48, 50, or 52 falls below a lower temperature threshold (e.g., 0 degrees Celsius), then the controller 58 may send a control signal to an actuator (e.g., an electric actuator) of the valve 54 to partially or entirely open the valve 54 to enable a flow of the heated fluid (e.g., the compressed airflow) to the manifold 42 and nozzles 96. As the temperature rises in the air intake conduit 13 downstream from the nozzles 96 (e.g., at the filter 44), the controller 58 may adjust the flowrate of the heated fluid by adjusting the valve 54 (e.g., gradually or immediately closing the valve 54) and/or the controller 58 may selectively adjust (e.g., open or close) valves 54 along other bleed conduits 32 (i.e., each having a different temperature of extracted airflow from the compressor 14). If the temperature reaches an upper temperature threshold in the air intake conduit 13, then the controller 58 may close the valve 54 of each bleed conduit 32.

Although FIG. 1 illustrates the compressed airflow from the compressor 14 as a heated fluid supplied to the manifold 42 and nozzles 96, certain embodiments of the anti-icing system 11 may be coupled to any one or more sources of heated fluid (e.g., other sources of heated airflow, exhaust gas, etc.). Accordingly, the controller 58 may monitor the anti-icing system 11 and control the flowrate and temperature of a heated fluid flow (e.g., heated airflow, exhaust gas, etc.) into the manifold 42 and through the nozzles 96 into the air intake conduit 13, thereby raising the temperature in the air intake conduit 13 to inhibit or remove ice formation on the filter 44 or elsewhere in the air intake 12 or the compressor 14. The deflector plates 98 help to distribute the heated fluid flow from the nozzles 96 more uniformly throughout the air intake conduit 13, particularly across the surface area of the filter 44.

Figure 2:
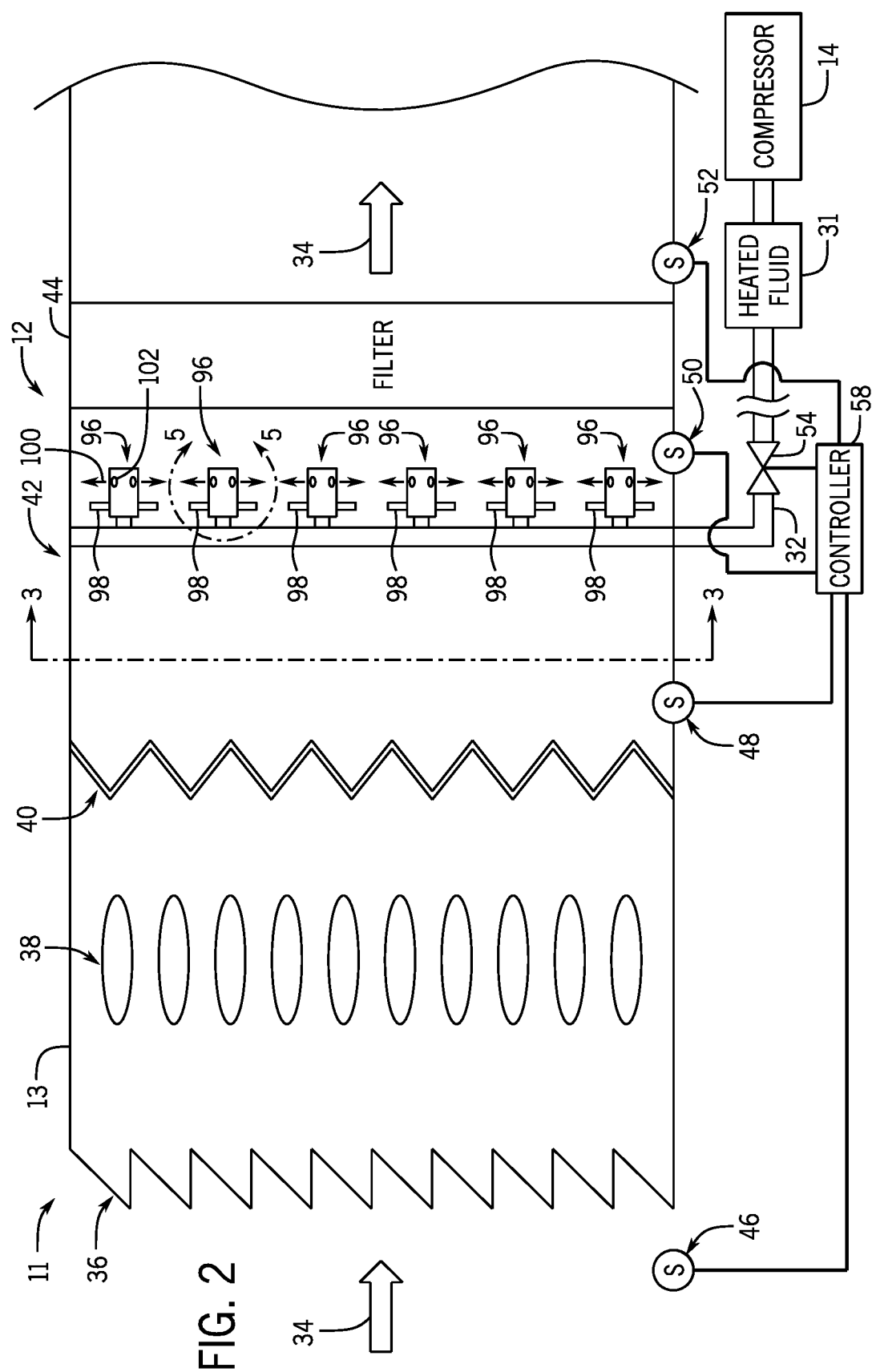
FIG. 2 is a schematic of the anti-icing system coupled to an air intake of the gas turbine system of FIG. 1, illustrating a manifold having a plurality of nozzles with deflector plates disposed in an air intake conduit in accordance with an embodiment.

FIG. 2 is a schematic of the anti-icing system 11 coupled to the air intake 12 of the gas turbine system 10 of FIG. 1, illustrating the manifold 42 having the plurality of nozzles 96 with deflector plates 98 disposed in the air intake conduit 13 in accordance with an embodiment. An airflow 34 (i.e., ambient air) enters the air intake 12 through air hood 36 (e.g., weather hood), which has a plurality of downwardly angled baffles to block entry of rain or snow. The sensor 46 is disposed at or external from the air hood 36 and is configured to monitor ambient conditions, such as ambient air temperature, pressure, humidity, or an air intake flow rate. As the airflow 34 passes through the air intake conduit 13, the airflow 34 passes through a baffle section having a plurality of silencer baffles 38; a coalescer section having coalescers 40; the anti-icing system 11 having the manifold 42, nozzles 96, and deflector plates 98; and a filter section having one or more filters 44. Although the above components are illustrated in a sequence one downstream from another in the air intake conduit 13, various embodiments may rearrange each of the foregoing components in any suitable order, except for the anti-icing system 11 remaining upstream from the filter 44.

In operation, the silencer baffles 38 have one or more acoustic attenuation features (e.g., acoustic attenuation surface features, internal material, etc.) to help reduce acoustic noise caused by the airflow 34 passing through the air intake 12. In the illustrated embodiment, the silencer baffles 38 are arranged in a row extending across the air intake conduit 13, each having an airfoil shaped body. The coalescers 40 are configured to remove water from the airflow 34. The coalescers 40 may include mechanical coalescers, electrostatic coalescers, or a combination thereof. The anti-icing system 11 includes the plurality of nozzles 96 and deflector plates 98 to distribute the heated fluid (e.g., compressed airflow at an elevated temperature) across the cross-sectional area of the air intake conduit 13, thereby helping to inhibit or remove ice formation in the air intake 12 and the compressor 14 (e.g., at the filter 44). The filter 44 may include any number and type of filters. The filters may be configured to filter particulate and moisture; however, the filters may be susceptible to ice formation at certain temperatures. Therefore, the disclosed embodiments of the anti-icing system 11 include the deflector plates 98 to help distributed the heated fluid more uniformly across the filter 44, thereby helping to avoid any cold spots where ice could potentially form.

In some embodiments, the air intake 12 may include additional air treatment components to treat the airflow 34 passing through the air intake conduit 13, e.g., particulate removal systems and water removal systems. Furthermore, the anti-icing system 11 may include any number and placement of sensors (S) throughout the air intake 12, including, but not limited to, the illustrated sensors 46, 48, 50, and 52 located upstream of the air hood 36, between the coalescers 40 and the manifold 42, between the manifold 42 and the filter 44, and downstream of the filter 44. As discussed above, the controller 58 is configured to receive sensor input from the sensors 46, 48, 50, and 52 to monitor conditions (e.g., temperature, pressure, flow rate, humidity, gas composition, or any combination thereof), compare those conditions against upper and/or lower thresholds, and adjust the valves 54 to control the flow of a heated fluid 31 through the manifold 42 and nozzles 96 into the airflow to elevate the temperature sufficient to inhibit or remove ice formation (e.g., on the filter 44).

Figure 12:
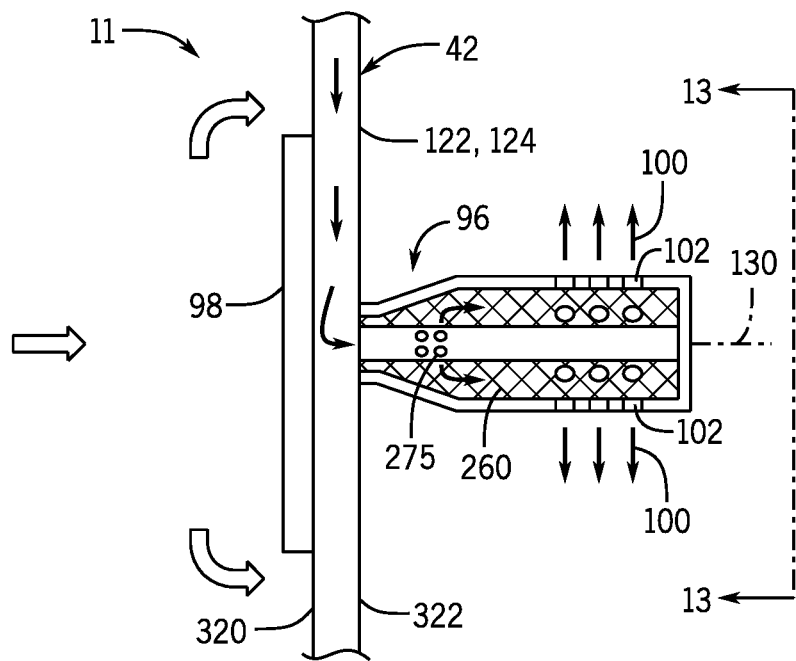
FIG. 12 is a schematic side view of a nozzle and a deflector plate coupled to a conduit of the manifold shown in FIG. 3 in accordance with an embodiment.

In the illustrated embodiment, the anti-icing system 11 has the plurality of nozzles 96 with deflector plates 98 distributed throughout the manifold 42, such as spaced in both a vertical direction and a horizontal direction creating a grid of nozzles 96 with deflector plates 98. In particular, in the illustrated embodiment, each nozzle 96 is coupled to the manifold 42 on a downstream side, such that the nozzle 96 protrudes away from the manifold 42 in a downstream direction with the airflow 34. In some embodiments (not shown), one or more of the nozzles 96 may be coupled to the manifold 42 on an upstream side, such that the nozzles 96 protrude away from the manifold 42 in an upstream direction against the airflow 34. The deflector plates 98 shown in FIG. 2 are coupled to the nozzles 96, particularly on an upstream portion of the nozzles 96. In some embodiments, such as shown in FIG. 12, the nozzles 96 and deflector plates 98 may be separate from one another, separately coupled to the manifold 42, and/or positioned on opposite sides of the manifold 42.

As the airflow 34 passes the plurality of nozzles 96, each deflector plate 98 helps to partially shield an injected flow 100 of the heated fluid 31 from outlets 102 in each nozzle 96. In certain embodiments, each nozzle 96 includes one or more rows of outlets 102 spaced circumferentially about the nozzle 96, such that the outlets 102 provide the injected flows 100 in multiple crosswise directions (e.g., perpendicular directions) relative to the airflow 34. The deflector plate 98 of each nozzle 96 helps to shield the injected flows 100 from the incoming airflow 34, thereby enabling the injected flows 100 to penetrate further into the air intake conduit 13 in the crosswise directions (and thus providing greater coverage of the surface area of the filter 44). In particular, the deflector plate 98 of each nozzle 96 helps to deflect or redirect the airflow 34 in a crosswise or lateral direction relative to a central axis of the nozzle 96, thereby providing a low velocity region downstream of the deflector plate 98 and adjacent the outlets 102 for improved penetration of the injected flows 100 into the airflow 34. Various embodiments of the deflector plates 98 (see FIGS. 4-13) may be used alone or in combination with one another.

Due to the deflector plates 98, the plurality of nozzles 96 (e.g., a two-dimensional grid of nozzles) are configured to more uniformly distribute the injected flows 100 of heated fluid 31 throughout the air intake conduit 13 and across the surface area of the filter 44, thereby improving the anti-icing capability of the anti-icing system 11. For example, the deflector plates 98 may enable sufficient distribution of the injected flows 100 of heated fluid 31 to eliminate cold spots that could otherwise experience ice formation and/or the deflector plates 98 may enable use of a smaller number of nozzles 96 at a greater spacing between adjacent nozzles 96. Overall, the deflector plates 98 and nozzles 96 help to distribute heat across the surface area of the filter 44 in order to increase the anti-icing capability of the anti-icing system 11.

In the illustrated embodiment, the heated fluid 31 includes the compressed airflow extracted from the compressor 14 as discussed above with reference to FIG. 1. The compressed air from the compressor 14 may be approximately 200 to 600° C., having approximate pressures of 800 to 900 kPa. However, the anti-icing system 11 may directly or indirectly use any one or more heated fluids to elevate the temperature of the airflow 34. For example, as illustrated, the heated fluid may be any suitable heated fluid that can be directly injected into the airflow 34 through the nozzles 96 to elevate the temperature of the airflow 34, including, but not limited to, a heated air or exhaust gas.

Alternatively or additionally, the anti-icing system 11 may include a heat exchanger configured to transfer heat from a first heated fluid to a second heated fluid for use in the nozzles 96. The first heated fluid may include a heated liquid or gas, such as exhaust gas, water, oil, etc.

In certain embodiments, the anti-icing system 11 may have the controller 58 communicatively coupled to valves 54 along bleed conduits 32 coupled to a plurality of heated fluids, such as an exhaust gas from the turbine 18, a reciprocating piston-cylinder combustion engine, a boiler, a furnace, or any other combustion system in a power plant. As an example, the exhaust gas may have temperatures of approximately 600 to 700° C. or greater. In this manner, the anti-icing system 11 can selectively use different heated fluids with appropriate temperatures to help elevate the temperature of the airflow 34 in the air intake conduit 13.

Figure 3:
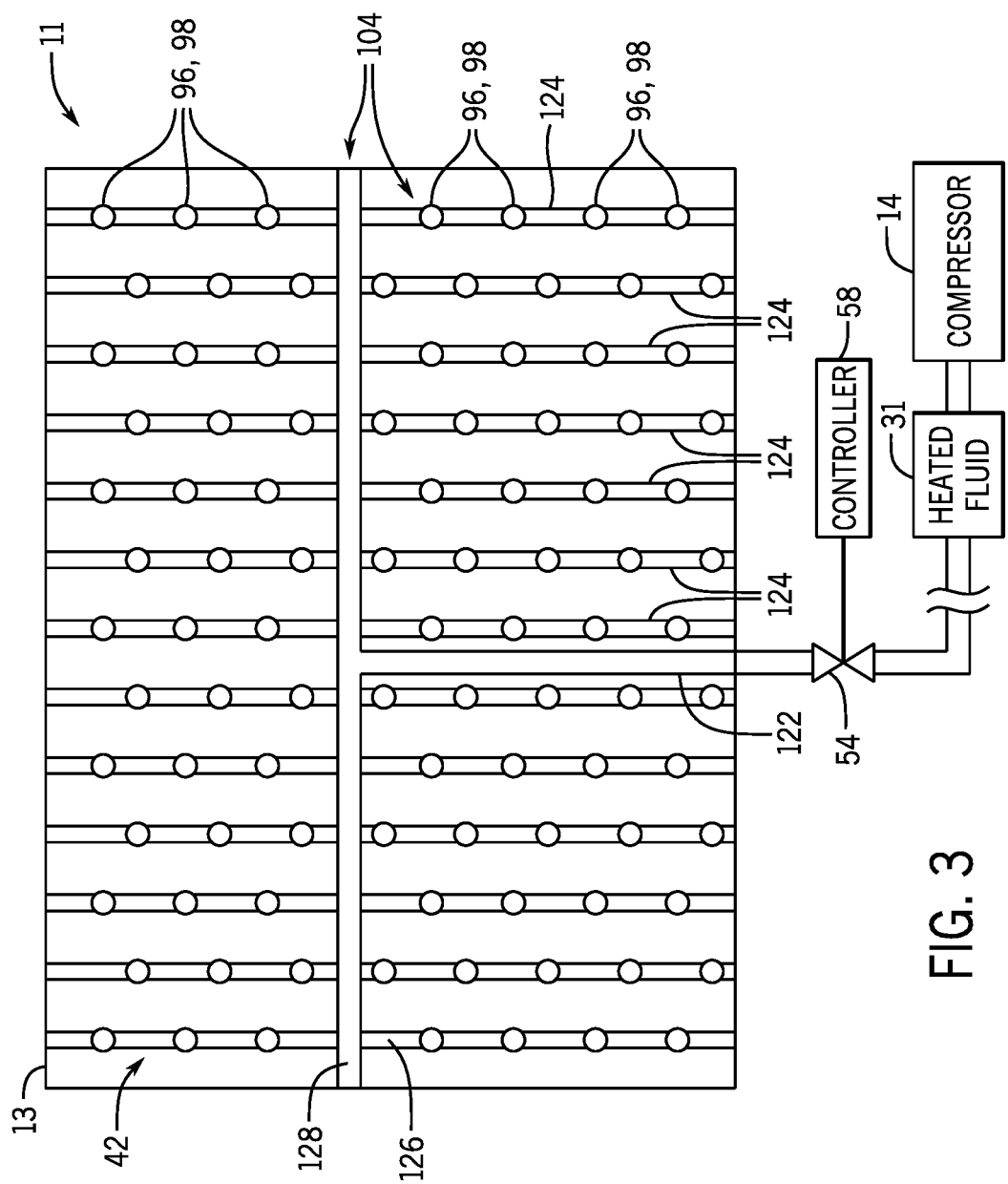
FIG. 3 is a schematic of the anti-icing system taken across the air intake conduit as indicated by line 3-3 of FIG. 2, illustrating the nozzles with deflector plates mounted on various conduits of the manifold across the flow path in the air intake conduit in accordance with an embodiment.

FIG. 3 is a schematic of the anti-icing system 11 taken across the air intake conduit 13 as indicated by line 3-3 of FIG. 2, illustrating the nozzles 96 with deflector plates 98 mounted on various conduits 104 of the manifold 42 across the flow path in the air intake conduit 13 in accordance with an embodiment. In the illustrated embodiment, the conduits 104 of the manifold 42 include a primary branch or supply conduit 122 and a plurality of secondary branches or distribution conduits 124. The illustrated supply conduit 122 includes a first supply conduit portion 126 and a second supply conduit portion 128, wherein the first and second supply conduit portions 126 and 128 are oriented crosswise relative to another (e.g., defining a T-shaped conduit). For example, the first supply conduit portion 126 may be a vertical conduit portion while the second supply conduit portion 128 may be a horizontal conduit portion. The distribution conduits 124 are mechanically and fluidly coupled to the supply conduit 122, e.g., at the second supply conduit portion 128.

In the illustrated embodiment, the distribution conduits 124 are arranged parallel (or substantially parallel) to one another with a uniform spacing between the adjacent distribution conduits 124. The plurality of nozzles 96 and deflector plates 98 are coupled to the plurality of distribution conduits 124; however, the nozzles 96 and deflector plates 98 also may be coupled to the supply conduit 122. The plurality of nozzles 96 and deflector plates 98 may be uniformly spaced relative to one another to define a two-dimensional grid across the air intake conduit 13 upstream of the filter 44. In the illustrated embodiment, the plurality of nozzles 96 and deflector plates 98 are staggered relative to one another from one distribution conduit 124 to another. In some embodiments, the plurality of nozzles 96 and deflector plates 98 may be aligned with one another from one distribution conduit 124 to another. As appreciated, any of the embodiments shown in FIGS. 4-13 may be used alone or in combination with the features shown in FIGS. 1-3.

Figure 4:
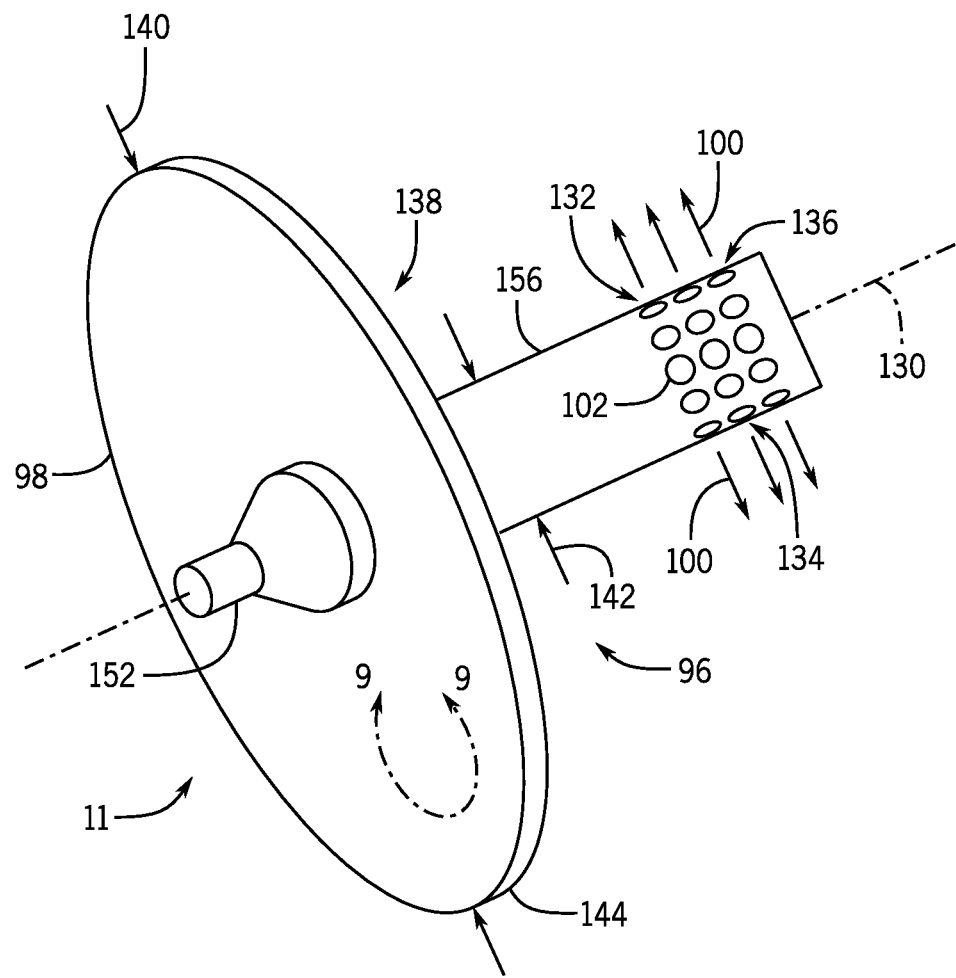
FIG. 4 is a perspective view of a nozzle having a deflector plate with an annular shape (e.g., an annular deflector plate) in accordance with an embodiment of the anti-icing system of FIGS. 1-3.

FIG. 4 is a perspective view of a nozzle 96 having a deflector plate 98 with an annular shape (e.g., an annular deflector plate) in accordance with an embodiment of the anti-icing system 11 of FIGS. 1-3. The nozzle 96 is configured to be mechanically and fluidly coupled to supply conduit 122 or distribution conduit 124 via a connector 152, e.g., connector conduit. The heated fluid 31 flows through connector 152 and into the nozzle 96. The heated fluid 31 exits the nozzle 96 as injected flows 100 through the outlets 102 (e.g., sonic holes or fluid injection ports) on a nozzle body, casing, or outer wall 156 of the nozzle 96. The heated fluid 31 exits nozzle 96 and distributes into the airflow within a portion of air intake 12 (e.g., upstream of filter 44). The deflector plate 98 allows for an increased distribution of heat in an airflow upstream of the filter 44.

In the illustrated embodiment, the outer wall 156 extends circumferentially around a central axis 130 of the nozzle 96, and the outlets 102 are spaced apart from one another circumferentially about the central axis 130 in multiple rows (e.g., rows 132, 134, and 136). The outlets 102 may be sized uniformly or non-uniformly within each row or from one row to another. Furthermore, the outlets 102 may be positioned within a low velocity region or recirculation zone 138 downstream from the deflector plate 98, thereby enabling the nozzle 96 to dispense the injected flows 100 from the outlets 102 further into the airflow 34 in a direction crosswise (e.g., perpendicular or acutely angled) relative to the airflow 34 and the central axis 130 of the nozzle 96.

In the illustrated embodiment, the nozzle 96 and the deflector plate 98 have an annular shape. In particular, the outer wall 156 of the nozzle 96 may be an annular outer wall 156, the deflector plate 98 may be an annular or circular deflector plate, and the outer wall 156 and the deflector plate 98 may be coaxial with the central axis 130. A diameter 140 of the deflector plate 98 at an outer edge 144 (e.g., radial edge) may be substantially greater than a diameter 142 of the nozzle 96 (i.e., at the location of the outlets 102 on the outer wall 156), thereby helping to increase penetration of the injected flows 100 into the airflow 34. For example, in certain embodiments, the diameter 140 may be at least equal to or greater than 1.5, 2, 2.5, 3, 3.5, 4, 4.5, 5, 5.5, or 6 times the diameter 142. The outer edge 144 is offset in the crosswise direction relative to the outlets 102, and the deflector plate 98 is configured to spread the airflow 34 upstream of the outlets 102.

As discussed in further detail below with reference to FIGS. 5-7, the deflector plate 98 may have a variety of geometries to help shield the injected flows 100 and enable greater distribution of the injected flows 100. These geometries of the deflector plate 98 are intended to be used in any combination on the plurality of nozzles 96.

Figure 5:
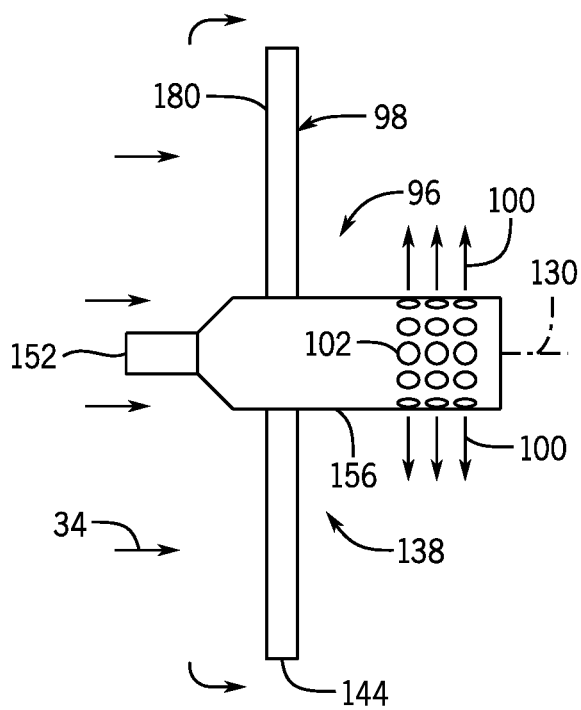
FIG. 5 is a schematic side view of a nozzle having a deflector plate with a flat disk shape (e.g., a flat deflector plate) in accordance with an embodiment of the anti-icing system of FIGS. 1-4.

FIG. 5 is a schematic side view of a nozzle 96 having a deflector plate 98 with a flat disk shape (e.g., a flat deflector plate) 180 in accordance with an embodiment of the anti-icing system 11 of FIGS. 1-4. The details of the nozzle 96 and deflector plate 98 are substantially the same as discussed in detail above. For example, the nozzle 96 and the deflector plate 98 may be annular structures coaxial with the central axis 130. In the illustrated embodiment, the deflector plate 98 (i.e., flat deflector plate 180) has a flat geometry extending from the outer wall 156 of the nozzle 96 to an outer perimeter or outer edge 144 of the deflector plate 98. In other words, the entire deflector plate 98 is flat, rather than including curved plate portions or angled plate portions.

As shown, the airflow 34 experiences an obstruction at deflector plate 98. Deflector plate 98 allows the heat of heated fluid 31, which flows out of nozzle 96 through outlets 102, to spread further in the crosswise direction relative to the central axis 130 as compared with a nozzle 96 lacking a deflector plate 98. Specifically, the velocity of the airflow 34 can significantly affect the spreading of heat through the air intake conduit 13 via the heated fluid 31. Indeed, as the velocity of the airflow 34 increases, the spreading of the heat of heated fluid 31 may decrease without the deflector plate 98. That is, without the deflector plate 98, the airflow 34 may redirect the injected flows 100 in the downstream direction at a distance closer to the outer wall 156 of the nozzle 96, thereby reducing the span of coverage of the injected flows 100. Thus, the deflector plate 98 creates the low velocity region or recirculation zone 138 adjacent the outlets 102, thereby enabling the injected flows 100 to penetrate further into the airflow 34 as indicated by arrows 100. While the flat geometry of FIG. 5 may be beneficial in spreading the injected flows 100, the deflector plate 98 of at least some of the nozzles 96 may include a different geometry, such as those shown in FIGS. 6 and 7.

Figure 6:
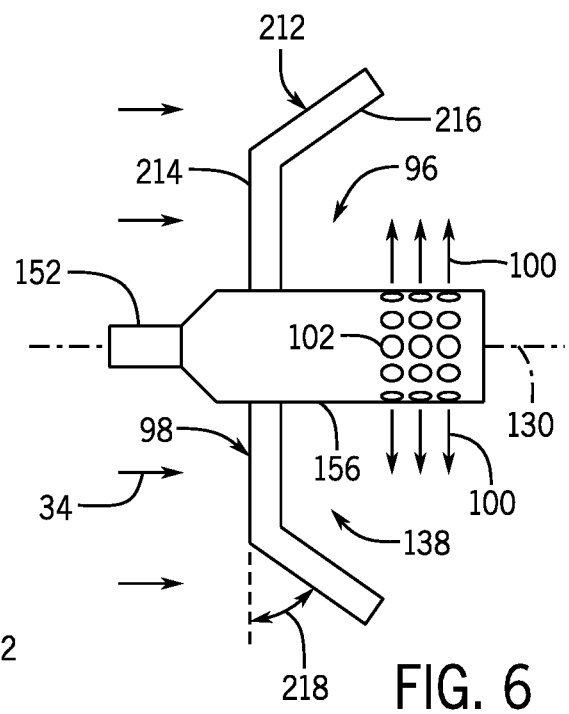
FIG. 6 is a schematic side view of a nozzle having a deflector plate with an inner flat portion and an outer angled portion (e.g., an angled deflector plate) in accordance with an embodiment of the anti-icing system of FIGS. 1-4.

FIG. 6 is a schematic side view of a nozzle 96 having a deflector plate 98 with an inner flat portion 214 and an outer angled portion 216 (e.g., an angled deflector plate 212) in accordance with an embodiment of the anti-icing system 11 of FIGS. 1-4. The details of the nozzle 96 and deflector plate 98 are substantially the same as discussed in detail above. For example, the nozzle 96 and the angled deflector plate 212 may be annular structures coaxial with the central axis 130. In the illustrated embodiment, the inner flat portion 214 may be a flat annular disk or circular deflector portion extending perpendicular to the central axis 130, and the outer angled portion 216 may be an angled annular wall or conical deflector portion.

The outer angled portion 216 is angled relative to the inner flat portion 214 by an angle 218, which may be a constant angle or a variable angle. For example, a constant angle 218 may define a conical deflector portion whereas a variable angle 218 may define a curved annular deflector portion similar to that shown in FIG. 7. The angle 218 may be greater than 0 and less than 90 degrees, for example, 5 to 60 degrees, 10 to 45 degrees, or 15 to 30 degrees. Further, some embodiments may include an angled deflector plate 212 that has an angle at more than one position radially outward from the outer wall 156, e.g., a plurality of conical deflector portions having two or more different angles 218. The outer angled portion 216 may help to shield the injected flows 100 by deflecting the airflow 34 at the angle 218 away from the nozzle 96.

Figure 7:
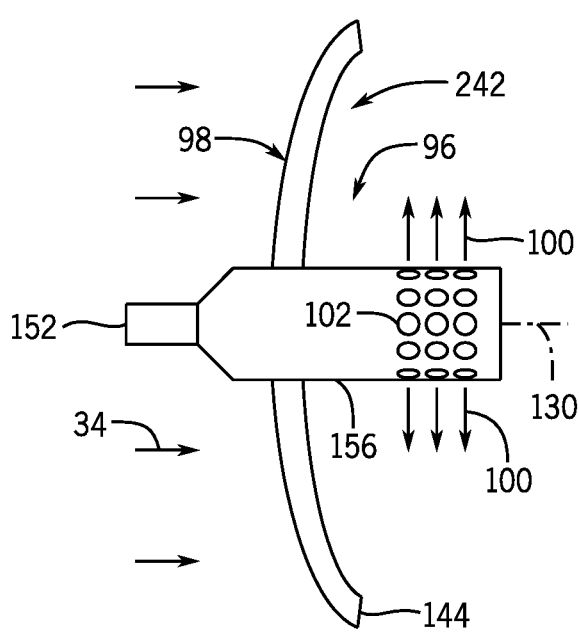
FIG. 7 is a schematic side view of a nozzle having a deflector plate with a curved shape (e.g., a curved deflector plate) in accordance with an embodiment of the anti-icing system of FIGS. 1-4.

FIG. 7 is a schematic side view of a nozzle 96 having a deflector plate 98 with a curved shape (e.g., a curved deflector plate 242) in accordance with an embodiment of the anti-icing system 11 of FIGS. 1-4. The details of the nozzle 96 and deflector plate 98 are substantially the same as discussed in detail above. For example, the nozzle 96 and the deflector plate 98 may be annular structures coaxial with the central axis 130. The curved deflector plate 242 gradually curves (and changes in angle) from the outer wall 156 of the nozzle 96 to the outer perimeter or outer edge 144 of the deflector plate 98. The curved deflector plate 242 may be described as a curved annular deflector plate (e.g., a bell-shaped deflector plate, a concave deflector plate, or a semi-spherical deflector plate) that is coaxial with the central axis 130. The curved deflector plate 242 may provide improved aerodynamics in the airflow 34 as compared with the deflector plates 98 shown in FIGS. 5 and 6.

Figure 8:
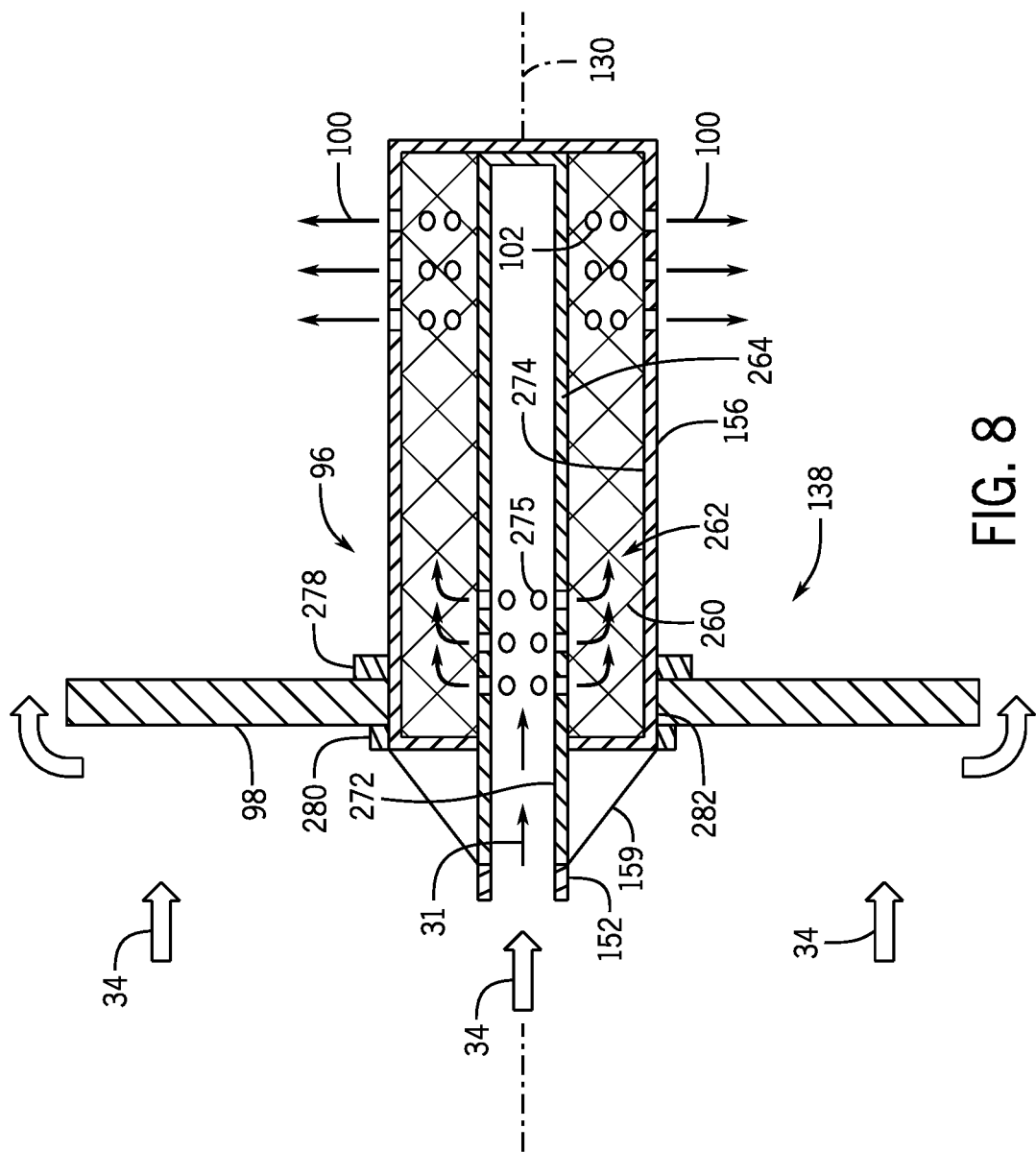
FIG. 8 is a cross-sectional side view of a nozzle having a deflector plate and an acoustic attenuation material in a cavity between an inner conduit and an outer wall in accordance with an embodiment of the anti-icing system of FIGS. 1-7.

FIG. 8 is a cross-sectional side view of a nozzle 96 having a deflector plate 98 and an acoustic attenuation material 260 in a cavity 262 between an outer surface of an inner conduit 264 and an inner surface 274 of the outer wall 156 in accordance with an embodiment of the anti-icing system 11 of FIGS. 1-7. The details of the nozzle 96 and deflector plate 98 are substantially the same as discussed in detail above. For example, the nozzle 96 and the deflector plate 98 may be annular structures coaxial with the central axis 130. Similarly, the inner conduit 264 may be an annular inner conduit that is coaxial with the central axis 130 and arranged concentric with the outer wall 156.

The connector 152 is disposed at an upstream end portion of the nozzle 96, and the connector 152 is configured to couple the nozzle 96 to the manifold 42 as shown in FIG. 3. In addition to the connector 152, the nozzle 96 has an annular portion or support 159 that extends from the inner conduit 264 to the outer wall 156. The manifold 42 distributes the heated fluid 31 into the connector 152 of each nozzle 96, and the heated fluid 31 then flows through an inner bore 272 of the inner conduit 264. After entering the inner bore 272, the heated fluid 31 flows through inner holes 275 (e.g., sonic holes or inner distribution ports) in the inner conduit 264 and into the cavity 262 between the inner conduit 264 and an outer bore 274 of the outer wall 156. The inner holes 275 may be arranged in one or more rows, and the inner holes 275 in each row may be spaced circumferentially about the central axis 130.

In the cavity 262, the heated fluid 31 travels through the acoustic attenuation material 260, e.g., a wire mesh, a plurality of baffles, or other structures configured to reduce noise. The heated fluid 31 exits the nozzle 96 through the outlets 102 in the outer wall 156 as the injected flows 100. The outlets 102 may be arranged in one or more rows and may be spaced circumferentially about the central axis 130.

As discussed above, the deflector plate 98 protects the injected flows 100 to enable greater penetration in the crosswise directions as indicated by arrows 100. In particular, the airflow 34 flows against the deflector plate 98, which then deflects the airflow 34 outwardly away from the outer wall 156 having the outlets 102 to provide the low velocity region or recirculation zone 138 to increase penetration of the injected flows 100 into the airflow 34. As a result, the deflector plates 98 of the plurality of nozzles 96 helps to provide more uniform heat distribution by the injected flows 100 into the airflow 34 and thus more uniform heating of the filter 44 to inhibit or remove ice formation.

In certain embodiments, the deflector plate 98 may be removably or permanently coupled to the nozzle 96. For example, the deflector plate 98 may be coupled to the nozzle 96 with a permanent joint, such as a welded joint or a brazed joint. Alternatively, the deflector plate 98 and the nozzle 96 may be formed as a one-piece structure, i.e., continuously formed without any joints. By further example, the deflector plate 98 may be removably coupled to the nozzle 96 with a removable coupling, such that the deflector plate 98 can be replaced or exchanged for a different type of deflector plate 98.

In the illustrated embodiment, the deflector plate 98 is disposed between an annular fastener or mount 278 and an annular fastener or mount 280. The annular mounts 278 and 280 may include threaded nuts, annular flanges, or other suitable removable or fixed fasteners. For example, the annular mount 278 may be coupled to the outer wall 156 of the nozzle 96 (e.g., welded joint or integrally formed with the outer wall 156), and the annular mount 280 (e.g., threaded nut) may be threaded onto exterior threads 282 on the outer wall 156 of the nozzle 96. Alternatively, the annular mount 280 may be coupled to the outer wall 156 of the nozzle 96 (e.g., welded joint or integrally formed with the outer wall 156), and the annular mount 278 (e.g., threaded nut) may be threaded onto exterior threads 282 on the outer wall 156 of the nozzle 96. The deflector plate 98 is axially captured or compressed between the annular mount 278 and the annular mount 280. Additionally, the deflector plate 98 may be threaded onto the exterior threads 282 between the annular mounts 278 and 280. In some embodiments, the deflector plate 98 may be fixedly coupled to the outer wall 156 via a welded joint or integrally formed with the outer wall 156. The deflector plate 98 and the nozzle 96 (e.g., outer wall 156) may be made of the same or different materials, such as a suitable metal.

Figure 9:
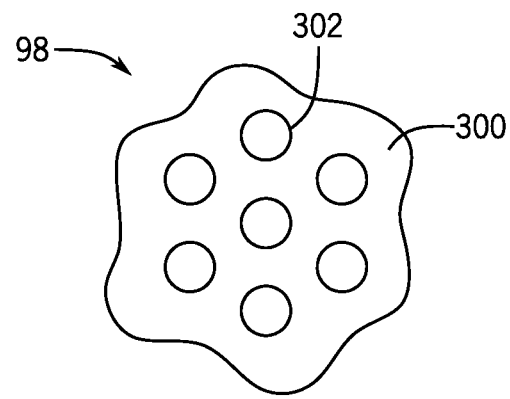
FIG. 9 is a partial front view of a deflector plate of a nozzle as indicated by line 9-9 of FIG. 4, illustrating a plurality of openings or airflow passages in the deflector plate (e.g., a perforated deflector plate) in accordance with an embodiment of the deflector plate shown in FIGS. 1-8.

FIG. 9 is a partial front view of a deflector plate 98 of a nozzle 96 as indicated by line 9-9 of FIG. 4, illustrating a plurality of openings or airflow passages 302 in a surface 300 of the deflector plate 98 (e.g., a perforated deflector plate) in accordance with an embodiment of the deflector plate 98 shown in FIGS. 1-8. The deflector plate 98 may be entirely or partially perforated with the airflow passages 302 as shown in FIG. 9, or the deflector plate 98 may be entirely free of perforations or passages 302. The airflow passages 302 may be uniformly or non-uniformly sized and spaced in the deflector plate 98. Furthermore, the airflow passages 302 may be uniformly or non-uniformly angled through the deflector plate, e.g., perpendicular or acutely angled relative to the surface 300 of the deflector plate 98. The airflow passages 302 may be used to further enhance or regulate the penetration and mixing of the injected flows 100 into the airflow 34. For example, the airflow passages 302 are configured to allow a more controlled mixing of the injected flows 100 of the heated fluid 31 with the airflow 34.

Figure 10:
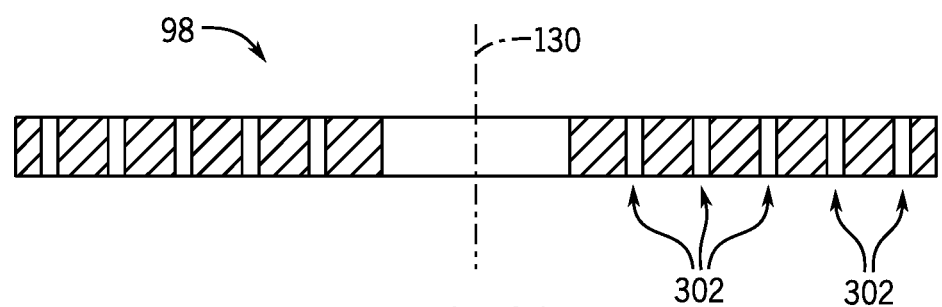
FIG. 10 is a cross-sectional view of the perforated deflector plate of FIG. 9, illustrating the plurality of airflow passages having uniform sizing and uniform spacing in accordance with an embodiment.

FIG. 10 is a cross-sectional view of the perforated deflector plate 98 of FIG. 9, illustrating the plurality of airflow passages 302 having uniform sizing and uniform spacing in accordance with an embodiment. Furthermore, the airflow passages 302 may be arranged parallel to one another and the central axis 130. In some embodiments, the airflow passages 302 may extend through the perforated deflector plate 98 at one or more acute angles relative to the central axis 130.

Figure 11:
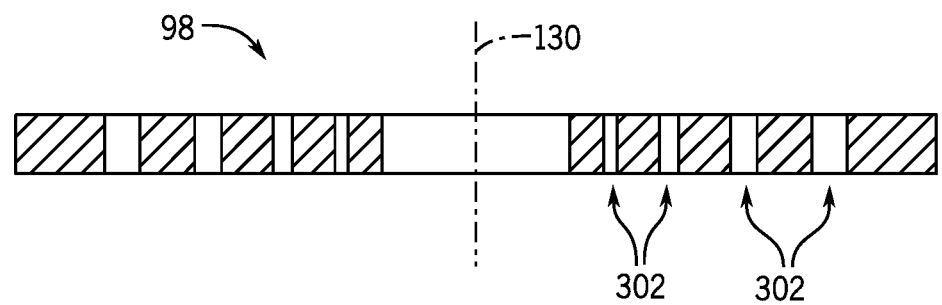
FIG. 11 is a cross-sectional view of the perforated deflector plate of FIG. 9, illustrating the plurality of airflow passages having non-uniform sizing and non-uniform spacing in accordance with an embodiment.

FIG. 11 is a cross-sectional view of the perforated deflector plate 98 of FIG. 9, illustrating the plurality of airflow passages 302 having non-uniform sizing and/or non-uniform spacing in accordance with an embodiment. Similar to the embodiment of FIG. 10, the airflow passages 302 may be arranged parallel to one another and the central axis 130. In some embodiments, the airflow passages 302 may extend through the perforated deflector plate 98 at one or more acute angles relative to the central axis 130. In the illustrated embodiment, the size (e.g., diameter) of the airflow passages 302 increases with a radial distance away from the central axis 130, thereby providing progressively greater airflow 34 through the deflector plate 98 further sway from the central axis 130.

FIGS. 10 and 11 illustrate the deflector plate 98 as having a uniform cross-sectional thickness from an upstream side to a downstream side. However, in some embodiments (not shown), one or more areas of the deflector plate 98 may have a greater thickness than other areas.

As discussed above, the diameter 140 of the deflector plate 98 may be approximately between 1.5 and 6 times the diameter 142 of the nozzle 96. However, in some embodiments, the diameter 140 of the deflector plate 98 may extend further than 6 times the diameter 142 of nozzle 96. For larger sized deflector plates 98, in order to better distribute the weight, the deflector plates 98 may be coupled to the manifold 42 rather than directly to the nozzle 96.

FIG. 12 is a schematic side view of a nozzle 96 and a deflector plate 98 coupled to a conduit (e.g., 122, 124) of the manifold 42 shown in FIG. 3 in accordance with an embodiment. Except for the mounting of the nozzle 96 and the deflector plate 98, the details of the nozzle 96 and deflector plate 98 are substantially the same as discussed in detail above. For example, the nozzle 96 and the deflector plate 98 may be annular structures coaxial with the central axis 130. As illustrated in FIG. 12, the nozzle 96 and the deflector plate 98 are separate structures, which are separately coupled to the manifold 42. For example, the deflector plate 98 is directly coupled to the manifold 42 on an upstream side 320 of the conduit (e.g., 122, 124), while the nozzle 96 is directly coupled to the manifold 42 on a downstream side 322 of the conduit (e.g., 122, 124). In this manner, the weight of the deflector plate 98 is carried by the manifold 42, rather than by the nozzle 96. The deflector plate 98 and the nozzle 96 may be removably coupled to the manifold 42 with a removable coupling, such as threaded fasteners, dovetail joints, hook and slot connections, or any combination thereof. Alternatively, or additionally, the deflector plate 98 and the nozzle 96 may be permanently coupled to the manifold 42 with a permanent joint, such as a welded joint.

Figure 13:
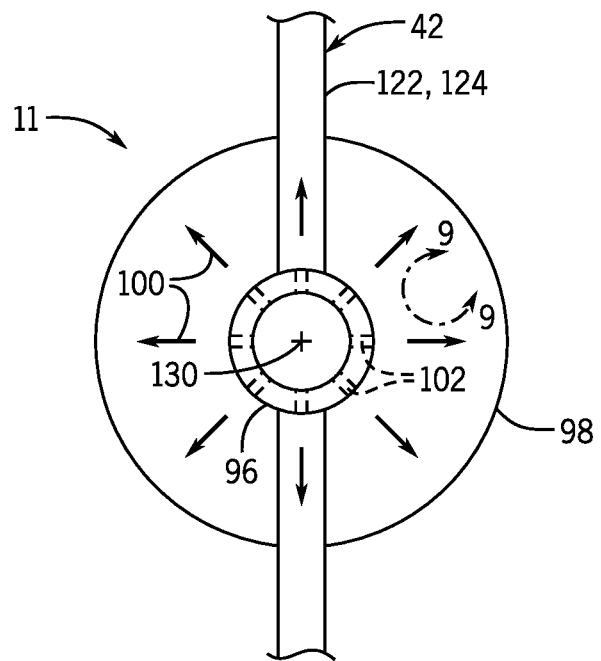
FIG. 13 is a rear view of the nozzle and the deflector plate coupled to the conduit as indicated by line 13-13 of FIG. 12, illustrating outlets in the outer wall of the nozzle spaced circumferentially about a central axis of the nozzle in accordance with an embodiment.

FIG. 13 is a rear view of the nozzle 96 and the deflector plate 98 coupled to the conduit (e.g., 122, 124) as indicated by line 13-13 of FIG. 12, illustrating outlets 102 in the outer wall 156 of the nozzle 96 spaced circumferentially about the central axis 130 of the nozzle 96 in accordance with an embodiment. As illustrated, the injected flows 100 of the heated fluid 31 radially exit the nozzle 96, while the deflector plate 98 protects the injected flows 100 to enable greater penetration in the radial direction. The illustrated outlets 102 are spaced uniformly in the circumferentially direction about the central axis 130 and thus the uniform spacing helps to provide a symmetric distribution of the heated fluid 31. The annular geometry of the deflector plate 98 also helps to provide symmetric protection of the injected flows 100 and thus more uniform heat distribution into the airflow 34 and onto the surface of the filter 44.

Technical effects of the invention include an improved distribution and mixing of a heated fluid 31 with an airflow 34 in an air intake 12 of a gas turbine system 10, thereby helping to inhibit or remove ice formation more uniformly in the air intake 12 (e.g., at a filter 44). For example, the deflector plates 98 substantially increase a distribution of heat by each nozzle 96, thereby allowing a reduction in the overall number of nozzles 96 while providing better anti-icing capability in the air intake 12.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims or if they include equivalent structural elements with insubstantial differences from the literal language of the claims.

The invention claimed is:

1. A system, comprising:
an anti-icing assembly, comprising:
a first nozzle having a nozzle body and an internal flow path extending within the nozzle body and leading to one or more outlets on the nozzle body configured to inject a heated fluid, into an airflow flowing along an airflow path, upstream of a filter of a gas turbine engine; and
a first deflector plate disposed upstream of the one or more outlets in the airflow path,
wherein the first deflector plate extends in a crosswise direction relative to a central axis the first nozzle to an outer edge the first deflector plate, wherein the first deflector plate extends about the central axis of the first nozzle,
wherein the outer edge is offset from the one or more outlets in the crosswise direction relative to the central axis of the first nozzle,
wherein the first deflector plate is separate from the internal flow path through the first nozzle,
wherein a first diameter of the first deflector plate is equal to or greater than two times a second diameter of the nozzle body, and
wherein the first deflector plate is configured to spread the airflow upstream of the one or more outlets.

2. The system of claim 1, comprising an air intake conduit having the anti-icing assembly disposed upstream of the filter.

3. The system of claim 2, comprising a compressor disposed downstream of the air intake conduit.

4. The system of claim 3, comprising the gas turbine engine, wherein the gas turbine engine comprises the compressor, a combustor, and a turbine.

5. The system of claim 1, wherein the first deflector plate is directly coupled to the first nozzle.

6. The system of claim 1, wherein the anti-icing assembly comprises at least one supply conduit configured to extend into the airflow path and supply the heated fluid to the first nozzle, the first nozzle is coupled to the supply conduit, and the first deflector plate is coupled to the supply conduit.

7. The system of claim 1, wherein the anti-icing assembly comprises a manifold having a plurality of conduits configured to extend into the airflow path and supply the heated fluid to a plurality of nozzles including the first nozzle;
 wherein each of the plurality of nozzles has its respective one or more outlets configured to inject the heated fluid;
 wherein the anti-icing assembly comprises a plurality of deflector plates including the first deflector plate; and
 wherein each of the plurality of deflector plates is disposed upstream of the one or more outlets of a respective one of the plurality of nozzles.

8. The system of claim 1, wherein the first deflector plate is symmetrical relative to the central axis of the first nozzle.

9. The system of claim 1, wherein the first deflector plate comprises a circular deflector plate.

10. The system claim 1, wherein the first deflector plate is a curved annular deflector plate.

11. The system of claim 1, wherein the first deflector plate is at least partially flat.

12. The system of claim 1, wherein the first deflector plate has an angled annular wall.

13. The system of claim 1, wherein the first deflector plate comprises a plurality of airflow passages extending from an upstream exterior side of the first deflector plate to a downstream exterior side of the first deflector plate, and the plurality of airflow passages are separate from the internal flow path through the first nozzle.

14. The system of claim 13, wherein the plurality of airflow passages is uniformly sized and uniformly spaced along a surface of the first deflector plate.

15. The system of claim 13, wherein the plurality of airflow passages is non-uniformly sized or non-uniformly spaced along a surface of the first deflector plate.

16. The system of claim 1, wherein the first deflector plate excludes any airflow passages extending from an upstream exterior side of the first deflector plate to a downstream exterior side of the first deflector plate.

17. The system of claim 1, wherein the first nozzle comprises an inner conduit disposed about the central axis of the first nozzle defining the inner flow path, an outer wall disposed about the inner conduit, and an acoustic attenuation material disposed in a cavity between the inner conduit and the outer wall;
 wherein the inner conduit, the outer wall, and the acoustic attenuation material axially overlap with one another over an axial distance along the central axis; and
 wherein the outer wall comprises the one or more outlets spaced circumferentially about the central axis first nozzle.

18. A system, comprising:
an anti-icing assembly, comprising:
 a first deflector plate configured to be disposed in an airflow flowing along an airflow path upstream of one or more outlets on a nozzle body of a first nozzle, wherein the one or more outlets are configured to receive a heated fluid from an internal flow path extending within the nozzle body and inject the heated fluid, into the path, upstream of a filter of a gas turbine engine,
 wherein the first deflector plate extends in a crosswise direction relative to a central axis of the first nozzle to an outer edge of the first deflector plate, wherein the first deflector plate extends about the central axis of the first nozzle,
 wherein the outer edge is offset from the one or more outlets in the crosswise direction relative to central axis of the first nozzle,
 wherein the first deflector plate is configured to be separate from the internal flow path through the first nozzle,
 wherein a first diameter of the first deflector plate is equal to or greater than two times a second diameter of the nozzle body, and
 wherein the first deflector plate is configured to spread the airflow upstream of the one or more outlets.

19. The system of claim 18, wherein the anti-icing assembly comprises a plurality of deflector plates including the first deflector plate, wherein each of the plurality of deflector plates is a circular deflector plate disposed coaxial with a central axis of a respective one of a plurality of nozzles including the first nozzle and the central axis thereof.

20. A method, comprising:
 injecting a heated fluid from an internal flow path within a nozzle body of a nozzle, through one or more outlets on the nozzle body, into an airflow flowing along an airflow path, upstream of a filter of a gas turbine engine to inhibit icing of the filter; and
 spreading the airflow upstream of the one or more outlets via a deflector plate disposed upstream of the one or more outlets in the airflow path,
 wherein the defector plate extends in a crosswise direction relative to a central axis of the nozzle to an outer edge of the deflector plate, wherein the deflector plate extends about the central axis of the nozzle,
 wherein the outer edge is offset from the one or more outlets in the crosswise direction relative to the central axis of the nozzle,
 wherein the deflector plate is separate from the internal flow path through the nozzle, and
 wherein a first diameter of the deflector plate is equal to or greater than two times a second diameter of the nozzle body.

* * * * *